United States Patent
Molnar et al.

(10) Patent No.: US 8,177,288 B2
(45) Date of Patent: May 15, 2012

(54) MOTOR VEHICLE

(75) Inventors: Bela Molnar, Ehningen (DE); Stefan Adams, Pforzheim-Hohenwart (DE); Helmut Eck, Rutesheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 86 days.

(21) Appl. No.: 12/466,734

(22) Filed: May 15, 2009

(65) Prior Publication Data

US 2009/0284043 A1  Nov. 19, 2009

(30) Foreign Application Priority Data

May 16, 2008 (DE) .......... 10 2008 024 891

(51) Int. Cl.
*B62D 37/02* (2006.01)
(52) U.S. Cl. .................. 296/180.5
(58) Field of Classification Search ............... 296/180.5, 296/180.3, 180.4, 180.2, 26.01, 26.12, 26.13, 296/180.1, 221, 216.03, 220.1; 180/903; 244/213; 105/1.3

See application file for complete search history.

(56) References Cited

U.S. PATENT DOCUMENTS

| | | | |
|---|---|---|---|
| 2,932,370 A * | 4/1960 | Bruder et al. ............... 192/219 |
| 4,278,922 A | 7/1981 | Grebe |
| 4,630,860 A * | 12/1986 | Fuerst et al. ............... 296/217 |
| 4,681,364 A * | 7/1987 | Bienert et al. ............. 296/217 |
| 5,031,959 A | 7/1991 | Queveau |
| 5,120,105 A * | 6/1992 | Brin et al. ................. 296/180.5 |
| 5,734,727 A | 3/1998 | Flaherty et al. |
| 5,833,305 A * | 11/1998 | Watzlawick et al. ......... 296/217 |
| 5,876,088 A * | 3/1999 | Spears ........................ 296/180.5 |
| 5,934,740 A | 8/1999 | Moebius et al. |
| 6,082,812 A * | 7/2000 | Lenkens et al. ............. 296/214 |
| 6,170,904 B1 | 1/2001 | Schaedlich et al. |
| 6,174,025 B1 * | 1/2001 | Henderson et al. .......... 296/217 |
| 6,357,823 B1 | 3/2002 | Birndorfer et al. |
| 6,378,932 B1 | 4/2002 | Fasel et al. |
| 6,382,708 B1 * | 5/2002 | Erdelitsch et al. ......... 296/180.5 |
| 6,485,091 B2 | 11/2002 | Karami et al. |
| 6,523,889 B2 | 2/2003 | Birndorfer et al. |
| 6,540,282 B2 * | 4/2003 | Pettey ........................ 296/180.5 |
| 6,648,406 B2 * | 11/2003 | Dittrich et al. ............. 296/217 |
| 7,322,638 B2 | 1/2008 | Larson |

(Continued)

FOREIGN PATENT DOCUMENTS

BE  1004749 A4  1/1993

(Continued)

OTHER PUBLICATIONS

European Search Report, Appl. No. 09002563.6, dated May 17, 2010 (with English Translation).

(Continued)

*Primary Examiner* — Glenn Dayoan
*Assistant Examiner* — Sunsurraye Westbrook
(74) *Attorney, Agent, or Firm* — RatnerPrestia

(57) ABSTRACT

A motor vehicle with at least one air guide device, which can be extended by means of a drive device, and which can be adjusted to at least one intermediate position between a maximally extended and a completely retracted position. The motor vehicle comprises an adjustable sliding/tilting roof, wherein a control unit is provided, which is designed so that it acts on an air guide element of the air guide device as a function of the position of the sliding/tilting roof.

11 Claims, 4 Drawing Sheets

U.S. PATENT DOCUMENTS

| | | | |
|---|---|---|---|
| 7,438,347 B2 | 10/2008 | Froeschle | |
| 7,866,741 B2 * | 1/2011 | Horiuchi et al. | 296/217 |
| 7,878,582 B2 * | 2/2011 | Fidan et al. | 296/217 |
| 2003/0090126 A1 | 5/2003 | Adams | |
| 2007/0236046 A1 * | 10/2007 | Froeschle et al. | 296/180.5 |
| 2009/0256387 A1 | 10/2009 | Pfertner et al. | |

FOREIGN PATENT DOCUMENTS

| | | |
|---|---|---|
| DE | 4305090 A1 | 8/1994 |
| DE | 10062156 A1 | 12/2000 |
| DE | 10062156 A1 | 6/2002 |
| DE | 10062736 A1 | 7/2002 |
| DE | 10138027 A1 | 3/2003 |
| DE | 10155376 A1 | 5/2003 |
| DE | 10340979 | 3/2004 |
| DE | 103 09 369 A1 | 9/2004 |
| DE | 202004020599 U1 | 9/2005 |
| DE | 10 2004 043 544 A1 | 3/2006 |
| DE | 44 27 196 A1 | 3/2006 |
| DE | 10 2005 030 203 A1 | 1/2007 |
| DE | 10 2004 030 571 B4 | 3/2007 |
| DE | 102006009048 A1 | 9/2007 |
| DE | 10 2006 014 260 A1 | 10/2007 |
| DE | 10 2008 018577 A1 | 10/2009 |
| EP | 0 226 778 A2 | 7/1987 |
| EP | 0882642 A1 | 12/1998 |
| EP | 0885799 A1 | 12/1998 |

OTHER PUBLICATIONS

Chinese Office Action dated Oct. 13, 2010, issued in corresponding Chinese Appl. No. 200910149736.4 with English Translation attached.

German Search Report dated Dec. 20, 2010, Application No. 102008018577.9.

German Search Report, mailed Mar. 6, 2012 (w/partial English Translation).

* cited by examiner

MOTOR VEHICLE

CROSS REFERENCE TO RELATED APPLICATIONS

This U.S. application claims priority to German Application DE 10 2008 024 891.6, filed on May 16, 2008, which is incorporated by reference herein in its entirety.

FIELD OF THE INVENTION

The present invention pertains to a motor vehicle with at least one air guide device which can be extended by a drive device.

BACKGROUND OF THE INVENTION

A motor vehicle of the general type in question with at least one air guide device with an air guide surface which can be extended by a drive is known from DE 103 09 369 A1. The air guide surface is held by a movable positioning mechanism comprising several pivot rods supported nonrotatably on the vehicle body and designed in such a way that, when the air guide surface is in its maximally extended position, at least one pivot rod of the positioning mechanism is supported by at least one stop. The goal here is to make it possible to use smaller and less powerful drives, because even at high speeds the air guide surface is supported exclusively by a self-locking lever mechanism and no longer has to be supported by the drive device itself.

An air guide device with an air-guiding spoiler blade and with an adjusting device, which moves the spoiler blade between a rest position and an operating position as needed, is also known from DE 10 2004 043 544 B4. In the operating position, the spoiler blade is located outside the car body structure. So that the air flow can be used as effectively as possible to generate downforce for the vehicle, the spoiler blade comprises an underflow guard, which prevents the air from flowing underneath the spoiler blade. At the same time, a water guide device, which forms an integral part of the spoiler blade, is provided, which is intended to prevent as far as possible the intrusion of water into the storage well of the air guide device.

Air guide devices on motor vehicles, especially on sports cars, are sufficiently well known and usually serve to generate downforce as the vehicle is being driven to improve the vehicle's grip on the road. Air guide devices with air guide elements which are deployed as a function of speed and thus comprise a steeper angle of incidence and generate more downforce at higher speeds than at lower speeds are also known. It is known that the aerodynamics of motor vehicles depend not only on their external contour but also on additional features such as whether or not the side windows are open, the presence of rearview mirrors, etc.

SUMMARY OF THE INVENTION

The present invention therefore deals with the problem of providing, for a motor vehicle of the type in question, an improved or at least a different embodiment in which the downforce generated by an air guide device can be individually influenced.

The invention relates to the general idea of actuating an air guide device, such as a rear spoiler, as a function of the degree to which a sliding/tilting roof is opened, so that the position of the air guide device is always adapted to the individual aerodynamic relationships, i.e., to the relationships attributable to the different degrees to which the sliding/tilting roof has been opened. The motor vehicle comprises the above-described air guide device, which can be adjusted to at least one intermediate position between a maximally extended and a completely retracted position. An inventively provided control unit detects the position of the sliding/tilting roof and thus determines the influence which the sliding/tilting roof has on the aerodynamic relationships. The control unit then actuates the air guide device as a function of the position of the sliding/tilting roof. It is certainly possible that the air guide device will be extended even farther out when the sliding/tilting roof is opened than when it is closed. An opened sliding/tilting roof and in particular one which is merely set at an angle can cause the air stream to separate, with the result that the air guide device located downstream in the driving direction can no longer generate enough downforce. For this reason—stored in a file of characteristic values, for example—the control unit can cause the air guide device and in particular the air guide element of that device to assume a larger angle of incidence when the sliding/tilting roof is open than when the sliding/tilting roof is closed. As a result, the aerodynamic relationships can be adapted with particular sensitivity to possible additional influences, and thus downforce which takes into account the influences of an opened sliding/tilting roof and which is therefore suited to the demands at the specific time in question can be generated.

In another advantageous embodiment of the inventive solution, the drive device of the air guide device comprises a central electric motor with two coaxial and flexible drive shafts, each of which cooperates at the end facing away from the electric motor with a lateral adjusting mechanism of the air guide device. This means that only one electric drive device, which drives the two adjusting mechanisms of the air guide device by way of the two flexible shafts to adjust the air guide device, is necessary. The flexible drive shafts make it possible to compensate for installation inaccuracies, which simplifies the assembly process. At the same time, this design makes it possible to use only a single electric motor to actuate the air guide device instead of having to use two electric motors, one for each adjusting mechanism. This makes it possible to reduce the number of different components and to decrease production costs as well. It is also conceivable that the electric motor of the drive device, which is arranged essentially in a central location, could also be encapsulated and would therefore neither absorb any vibrations nor transmit any vibrations to the body. This helps to reduce, if not to eliminate entirely, the noise produced when the air guide device is actuated, as a result of which it is possible to increase the sense of driving enjoyment.

In another advantageous embodiment of the inventive solution, the adjusting mechanism comprises a spindle drive and several interacting adjusting levers. A spindle drive of this type usually has a threaded spindle, occasionally also called a leading screw, which cooperates with a threaded nut to convert a rotational movement into a translational movement. It is especially advantageous in this case for this spindle drive to be self-locking, so that, even at high speeds, at which powerful forces usually act on the air guide device, the electric drive device can be turned off and the air guide device or air guide element of that device can be held in its position exclusively by the self-locking action of the spindle drive. In addition, it is possible with these types of spindle drives to produce extremely precise adjusting movements, so that the position of the air guide device can be adjusted with especially fine sensitivity.

Other important features and advantages of the invention can be derived from the drawings, and from the associated description of the figures, which is based on the drawings.

It should be obvious that the features cited above and yet to be explained below are applicable not only when combined as specifically stated but also in other combinations as well or even when used alone without leaving the scope of the present invention.

Preferred exemplary embodiments of the invention are illustrated in the drawings and will be explained in greater detail in the following description, where the same, similar, or functionally equivalent components are designated by the same reference numbers.

BRIEF DESCRIPTION OF THE DRAWINGS

In schematic form.

DETAILED DESCRIPTION OF THE DRAWINGS

Figure 1:
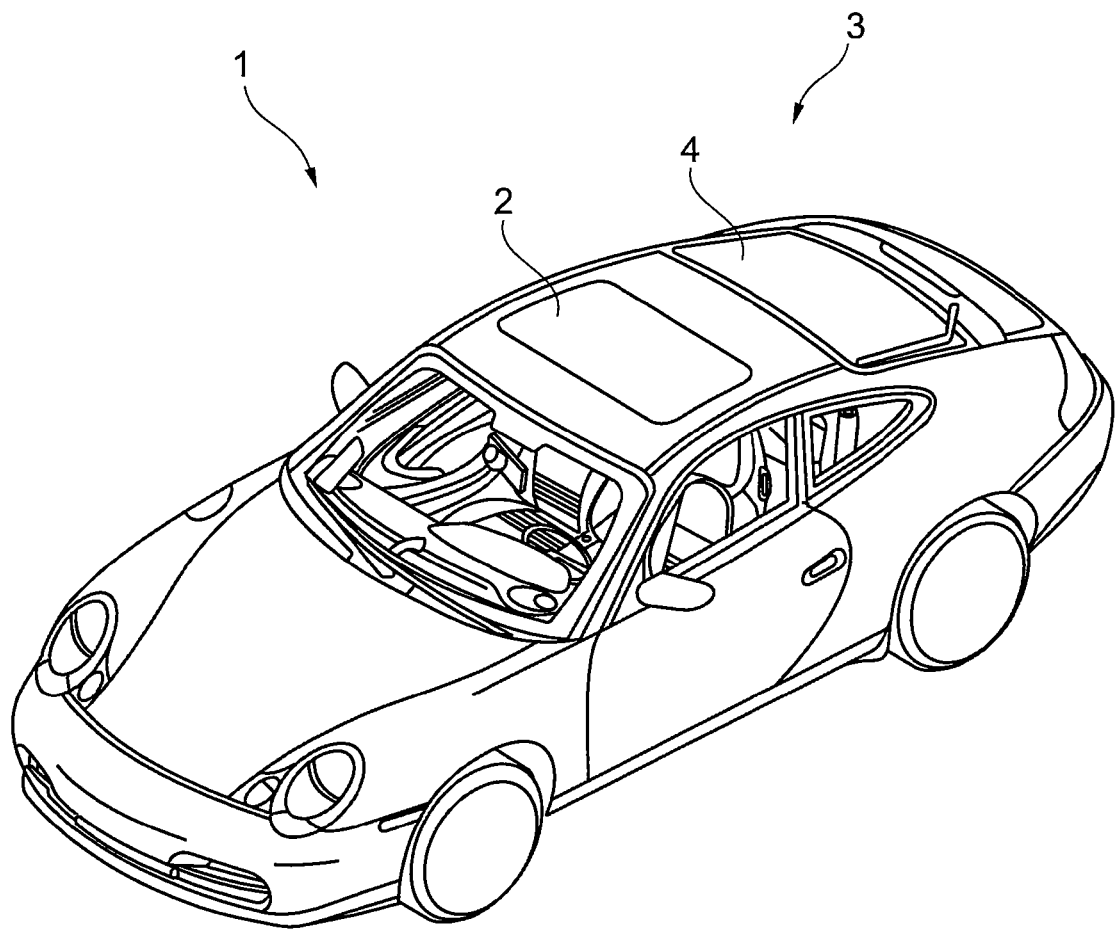
FIG. 1 shows a view of an inventive vehicle.

As shown in FIG. 1, an inventive motor vehicle 1 comprises an adjustable, specifically an openable, sliding/tilting roof 2 and an air guide device 3, provided in the rear area of the motor vehicle 1. The air guide device 3 can be designed as an extendable rear spoiler and comprise an air guide element 4 such as a spoiler plate. The air guide device 3 or its air guide element 4 can be adjusted to at least one intermediate position between a maximally extended and a completely retracted position. According to FIG. 1, the rest position of the air guide device 3 is shown, as would usually be present when the motor vehicle 1 is parked. The air guide device 3 or its air guide element 4 is adjusted by means of a drive device 5 (see FIG. 2), which is usually designed as an electric motor. A control unit is provided, which actuates the air guide device 3 or its associated air guide element 4 as a function of the position of the sliding/tilting roof 2. This means that, when the sliding/tilting roof 2 is opened or tilted, the control unit causes the air guide device 3 or its air guide element 4 to extend farther than it does when the sliding/tilting roof 2 is closed. The goal to be achieved here is to compensate for the separation of the air stream which occurs when the sliding/tilting roof 2 is opened, which automatically decreases the amount of downforce acting on the motor vehicle 1, so that, in the most favorable case, the same amount of downforce is generated as that which is generated when the sliding/tilting roof 2 is closed.

Figure 2:
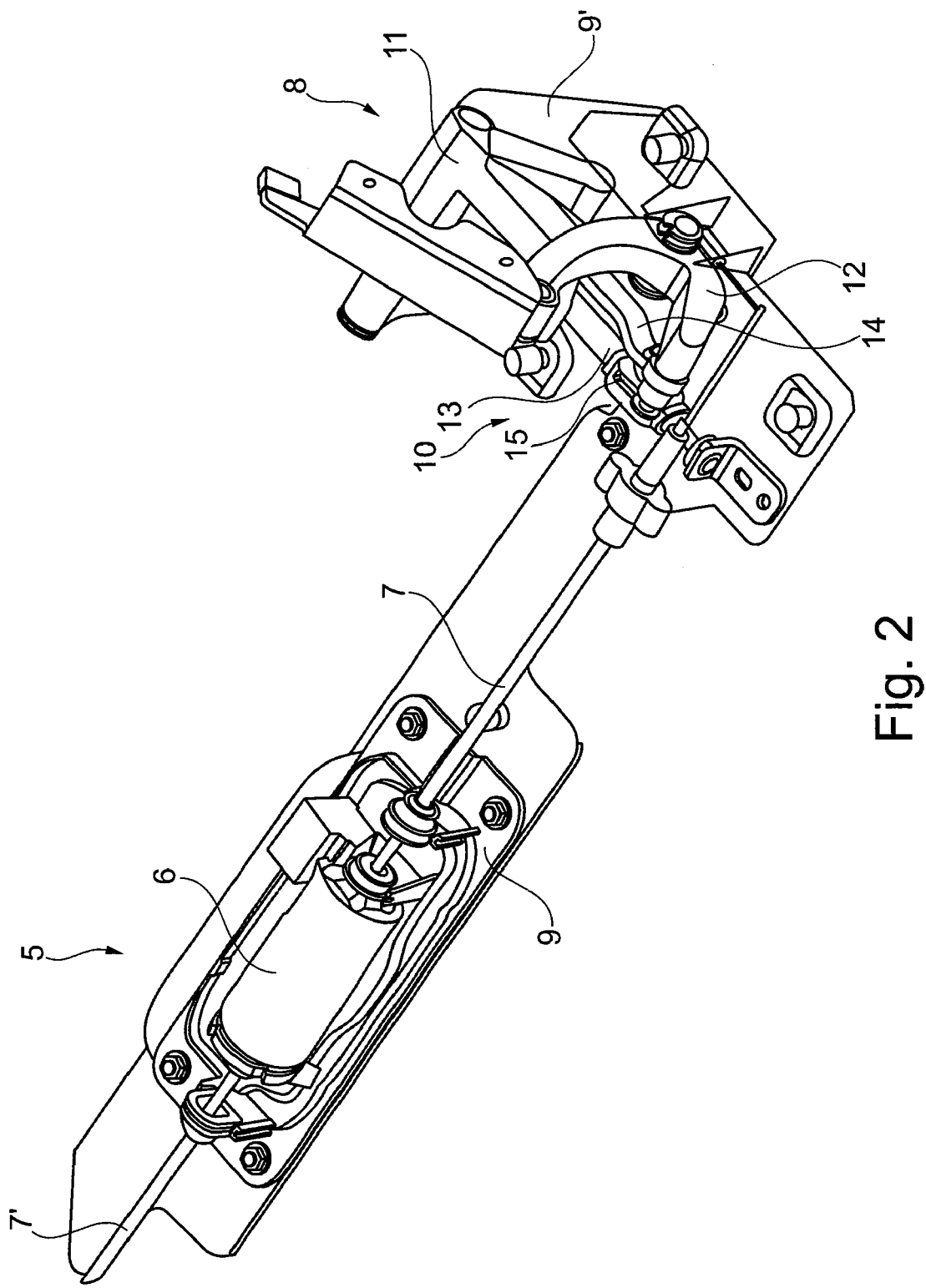
FIG. 2 shows a drive device and an adjusting mechanism of an inventive air guide device.
Figure 3:
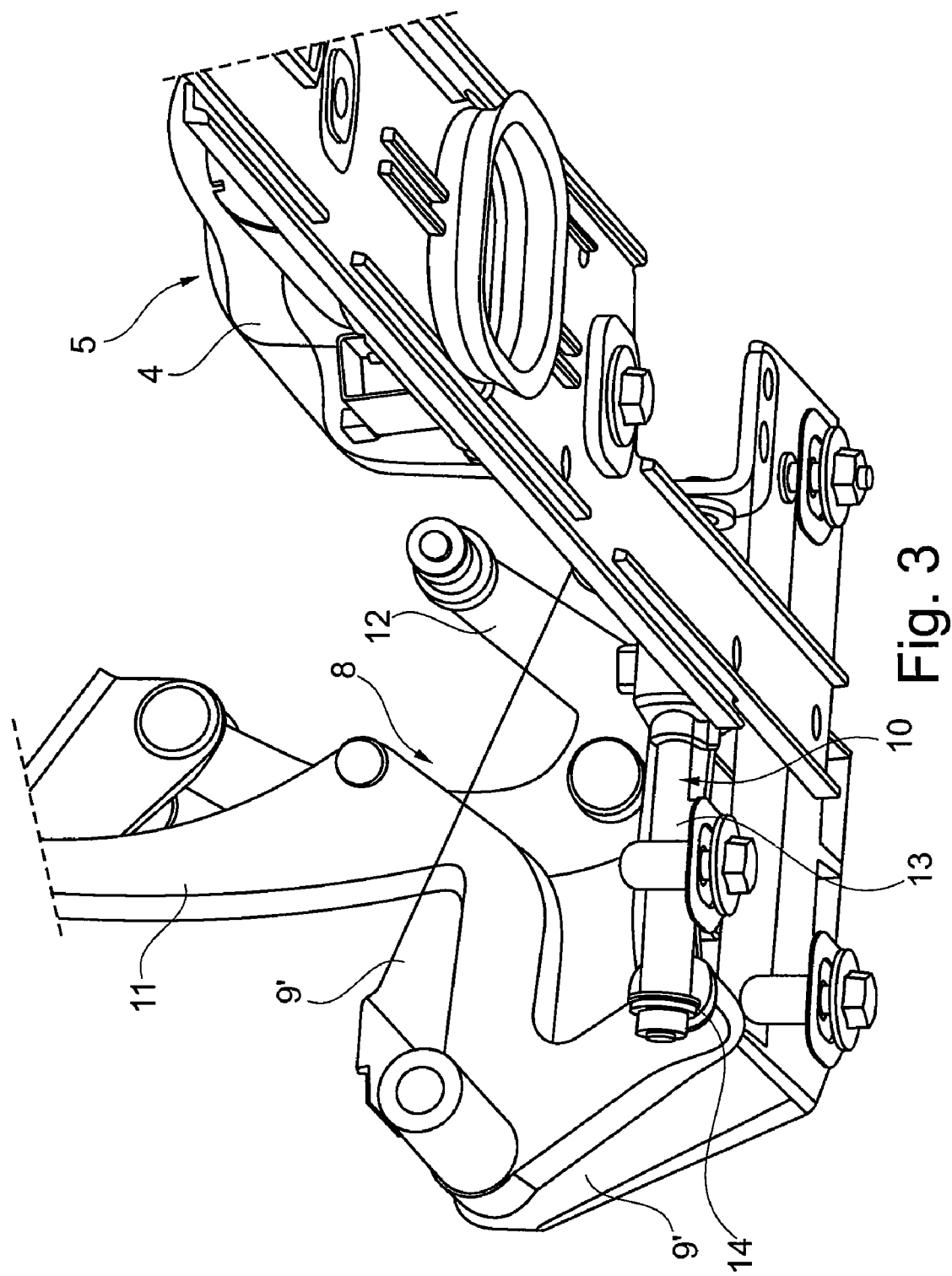
FIG. 3 shows a detailed diagram of the adjusting mechanism of the air guide device.
Figure 4:
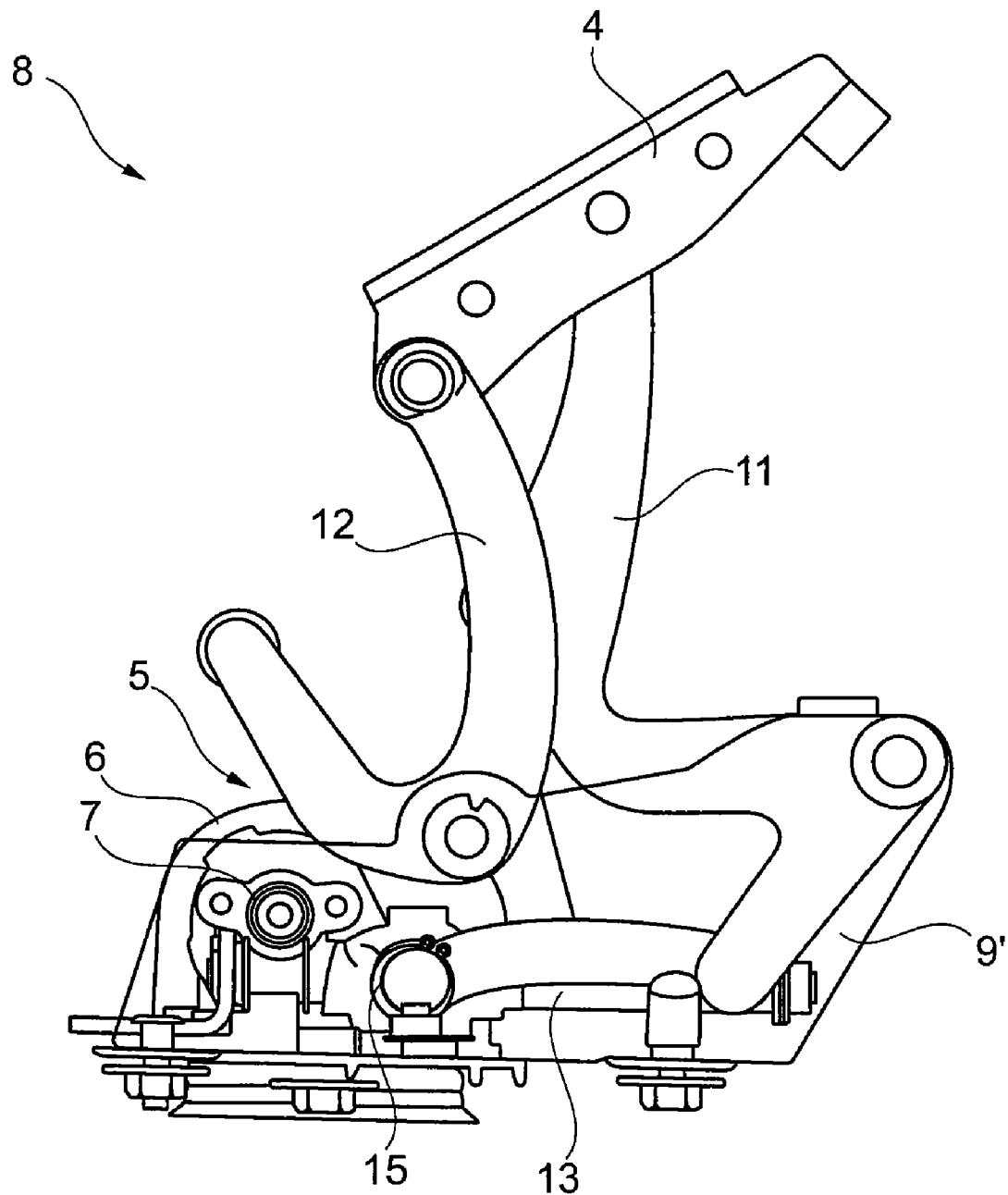
FIG. 4 shows a diagram similar to that of FIG. 3 but from a different angle.

To adjust the air guide device 3 or its air guide element 4, the drive device 5 mentioned above is used, which, according to the embodiment shown in FIG. 2, comprises a central electric motor 6 with two coaxial, flexible drive shafts 7 and 7'. The two drive shafts 7, 7' leave from opposite ends of the electric motor, and the ends of these shafts facing away from the electric motor 6 are connected to lateral adjusting mechanisms 8 of the air guide device 3. The electric motor 6 can have an encapsulated design and in particular be attached to a carrier element 9 by way of vibration-damping elements. The drive shafts 7 and 7' of the electric motor 6 extend essentially in the transverse direction of the vehicle, so that the two adjusting mechanisms 8, 8' are located at the sides. The adjusting mechanism 8, the only one of these mechanisms shown, comprises a spindle drive 10 and several interacting levers 11 and 12. A threaded spindle 13 of the spindle drive 10 extends essentially at a right angle to the drive shaft 7.

In general, the adjusting mechanism 8 comprises a carrier element 9', the two adjusting levers 11, 12, which are rotatably supported on it, and the spindle drive 10. The first adjusting lever 11 is designed as a so-called knee lever and is supported rotatably by its knee on the carrier element 9'. At one longitudinal end, the first adjusting lever 11 is connected rotatably to the air guide element 4 and at the other end rotatably to an adjusting element 14. The adjusting element 14 acts as a pendulum-type support, and the end of it which faces away from the first adjusting lever 11 is mounted rotatably on a spindle nut 15, which, when the spindle drive 10 is actuated, that is, when the threaded spindle 13 rotates, is adjusted in a translational manner.

The second adjusting lever 12, however, which is also designed as a knee lever, is supported rotatably by its knee area on the carrier element 9'. One of its two longitudinal ends, like the first adjusting lever 11, is supported rotatably on the air guide element 4. Actuation of the adjusting mechanism 8 brings about the rotation of the first adjusting lever 11 and via the air guide element 4 also a rotation of the second adjusting lever 12. In principle, upon actuation of the adjusting mechanism 8, the air guide device 3, that is, the air guide element 4 of that device, is adjusted translationally and rotationally. In addition, the air guide device 3, that is, its air guide element 4, can be adjusted into a position which is optimized with respect to its drag coefficient (Cw) value, which corresponds to normal mode, or extended into a sports mode, where, in the sports mode, the air guide element 4 is tilted to an even steeper angle, resulting in an increase in the downforce acting on the motor vehicle 1.

As a result of the adjusting mechanism 8 with its individual adjusting levers 11 and 12, a superimposed type of movement is produced when the air guide element 4 is extended from its rest position, namely, the rotation described above and an additional linear displacement toward the rear of the vehicle, as a result of which, overall, it is possible to achieve an increase in the amount of downforce. In general, it is conceivable that the adjusting mechanism 8 or the individual adjusting levers 11 and 12 or the adjusting element 14 could be made of light metal or plastic and thus comprise a lower weight, which is especially advantageous in the design of sports cars.

While preferred embodiments of the invention have been described herein, it will be understood that such embodiments are provided by way of example only. Numerous variations, changes and substitutions will occur to those skilled in the art without departing from the spirit of the invention. It is intended that the appended claims cover all such variations as fall within the spirit and scope of the invention.

The invention claimed is:

1. A motor vehicle comprising:
    at least one air guide device, which configured to be extended by a drive device, and which configured to be adjusted to at least one intermediate position between a maximally extended position and a completely retracted position,
    an adjustable tilting roof, and
    wherein the drive device is configured to move an air guide element of the air guide device as a function of a tilt position of the tilting roof,
    wherein the at least one air guide element of the air guide device is positioned on a rear end of the motor vehicle at a location that is behind the tilting roof and above rear wheels of the vehicle to generate a downforce at the rear end of the motor vehicle as a function of the position of the tilting roof.

2. A motor vehicle according to claim 1, wherein the drive device of the air guide device comprises a central electric motor with two coaxial, flexible drive shafts, wherein the ends of the drive shafts facing away from the electric motor are connected to lateral adjusting mechanisms of the air guide device.

3. A motor vehicle according to claim 2, wherein the adjusting mechanism comprises a spindle drive.

4. A motor vehicle according to claim 3, wherein the drive shafts of the electric motor are arranged in a transverse direction of the vehicle and are arranged at a right angle with respect to a threaded spindle of the spindle drive.

5. A motor vehicle according to claim 3, wherein the adjusting mechanism adjusts the air guide element of the air guide device both translationally and rotationally.

6. A motor vehicle according to claim 1, wherein the air guide device is configured to be moved into a normal mode or into a sports mode, wherein the normal mode corresponds to a position of the air guide device optimized with respect to a drag coeeficient (Cw) value and generates either no downforce on the rear end of the motor vehicle or less downforce on the rear end of the motor vehicle than when the air guide device is moved into the sports mode.

7. A motor vehicle according to claim 3, wherein the adjusting mechanism comprises a carrier element and two adjusting levers, wherein the adjusting levers are supported rotatably thereon and each of the adjusting levers is also connected rotatably to an air guide element of the air guide device.

8. A motor vehicle according to claim 7, wherein a first of the two adjusting levers is connected rotatably to an adjusting element, the opposite end of the adjusting element being connected rotatably to a spindle nut, which is adjusted translationally upon actuation of the spindle drive.

9. A motor vehicle according to claim 8, wherein an actuation of the adjusting mechanism causes a rotation of the first adjusting lever and, by way of the air guide element, also a rotation of the second adjusting lever.

10. A motor vehicle according to claim 1, wherein the at least one air guide device is not positioned either on or adjacent the sliding/tilting roof of the motor vehicle.

11. A motor vehicle according to claim 1, wherein the at least one air guide device is positioned behind a rear windshield of the motor vehicle.

* * * * *